US005525896A

United States Patent [19]

Minks

[11] Patent Number: 5,525,896

[45] Date of Patent: Jun. 11, 1996

[54] FUEL GAUGE POWER SYSTEM FOR USE WITH ALTERNATING CURRENT VEHICLE ELECTRICAL SYSTEM

[76] Inventor: Floyd M. Minks, 2700 Partin Settlement Rd., Kissimmee, Fla. 32743

[21] Appl. No.: 146,932

[22] Filed: Oct. 28, 1993

Related U.S. Application Data

[63] Continuation of Ser. No. 872,019, Apr. 22, 1992, abandoned.

[51] Int. Cl.$^6$ .............................. G05F 1/40; H02M 7/155

[52] U.S. Cl. ............................ 323/282; 323/300; 363/89; 363/124

[58] Field of Search .............................. 323/282,284,300; 363/84, 85, 87, 88, 89, 124

[56] References Cited

U.S. PATENT DOCUMENTS

| | | | |
|---|---|---|---|
| Re. 29,245 | 5/1977 | Minks | 315/78 |
| 3,921,058 | 11/1975 | Tanaka et al. | 323/300 |
| 4,161,022 | 7/1979 | Kanazawa et al. | 363/80 |
| 4,768,142 | 8/1988 | Pasma | 363/89 |
| 4,945,465 | 7/1990 | Marinus | 363/89 |
| 5,055,994 | 10/1991 | Schoofs | 363/127 |

*Primary Examiner*—Peter S. Wong
*Assistant Examiner*—Adolf Berhane
*Attorney, Agent, or Firm*—Allen, Dyer, Doppelt, Franjola & Milbrath

[57] ABSTRACT

An electrical system for supplying power from a source of alternating current to a gauge system functions as a half wave rectifier below a selected current level. The system prevents the rise of current above the selected current level and once that selected level is reached, reduces the time that the current flows to approximately one-fourth of the waveform of the alternating current.

7 Claims, 4 Drawing Sheets

FUEL GAUGE POWER SYSTEM FOR USE WITH ALTERNATING CURRENT VEHICLE ELECTRICAL SYSTEM

This is a continuation of application Ser. No. 07/872,019 filed Apr. 22, 1992, now abandoned.

This invention relates to means of supplying the required electrical power to a fuel gauge system of a known type commonly used in direct current automotive systems. This invention allows safe and accurate use of these known gauges when the fuel gauge system is installed in a vehicle having only an alternating current electrical system,

BACKGROUND OF THE INVENTION

Small vehicles such as snowmobiles may typically have simple electrical systems consisting of a engine driven alternator, usually the permanent magnet type, connected in parallel with a shunt type AC regulator and a lighting system, and in some cases other electrical loads. Regulators of this type control the alternating current root mean square voltage of the alternator. A typical example of such a regulator would be found in Applicant's U.S. Pat. No. 3,755,709. It is common practice on these vehicles, and sometimes required by regulations, that the head lamps and tail lamps on the vehicles be illuminated whenever the engine is running. Therefore light switches, other than for selecting high and low beam, are not included. In the simplest of these vehicles there may be no other electrical components other than the alternator, voltage regulator and lights already mentioned. This existing configuration can be seen in the circuit diagram shown as FIG. 1. Even though the vehicle manufacturer supplies the vehicle without a light switch, some customers may object to the lights being on all the time, and ignoring safety implications, install their own switches. If a permanent magnet alternator of the type commonly used on these vehicles is operated open circuit or with little electrical load, the alternator voltages can be quite high at maximum engine speed. Typically an alternator that might be used in a nominal 12 volt electrical system could produce 100 volts if the voltage regulator and the other loads were removed. Thus in FIG. 1, if a vehicle owner installed a light switch at point C only the lights would be turned off when the switch was open and the voltage regulator would still control the voltage to the other electrical loads. However if the switch were installed at location B, any time the lights were turned off the regulator would be disconnected from the alternator, therefore full alternator open circuit voltage would be across small electrical loads that might be connected at point A. If no other electrical loads were present, the electrical system would appear to work normally even with a switch installed at point C.

It should be realized also that other failures in wiring or of other components in the electrical system might also produce high voltages on a portion of the electrical system where other electrical loads might be connected. FIG. 2 shows a circuit diagram and a portion of the mechanical parts of a fuel gauge system of a type well known and often used in direct current automotive applications. The system consists of an indicator needle attached to a pivot and also to a permanent magnet. Two electrical windings, shown as L1 and L2, supply a magnetic field around the permanent magnet. These windings are normally mechanically placed so that they are approximately 90 degrees apart. One of the 2 windings has a variable resistor, shown as R1, externally connected in series. This resistor is normally within the fuel tank and varied by a float. The float position changes with the level of fuel in the tank. With R1 at a value quite high compared to the internal resistance of L2, the magnet would tend to align itself with the magnetic field of L1 which would correspond to one pointer location. At the other extreme float location with the resistance of R1 near zero, the internal resistances of L1 and L2 can be so designed that the magnet will align itself with the magnetic field of L2 moving the pointer to the other end of the scale. Intermediate positions of the resistor R1 will give intermediate positions of the pointer.

It is understood by those involved in these instruments that the position of the pointer is dependant on the direction of the vector sum of the magnetic fields of L1 and L2 and thus independent of the magnitude of the power supply voltage supplied from point D to ground. Therefore, the gauge can be made to read accurately whether the voltage at point D is a steady DC voltage or varying DC voltage such as would result from a rectified AC signal. The high limit of voltage useable at point D is determined by the maximum heating allowable in L1, L2 or R1.

Since R1 is mounted, normally as an exposed resistor within the fuel tank, overheating of this component could be extremely dangerous causing possible fire or explosion. The low limit of the voltage useable at point D would be when the mechanical friction in the pivot became significant compared to the attraction of the magnetic field from coils L1 and L2 to the magnet attached to the pivot. It is known that the magnetic force in a circuit of this type increases with the square of the magnetic field. Since the magnetic field involved is essentially proportional to the instantaneous voltage at point D, it can be understood that a pulsed DC voltage at point D is very effective in overcoming the mechanical friction associated with the pivot.

A first attempt at connecting the known gauge system as shown in FIG. 2 to the known electrical system as is shown in FIG. 1 might be to connect a diode directly from point A in FIG. 1 to point D in FIG. 2 with the anode of the diode to point A. This would indeed supply appropriate electrical voltages to the gauge system for proper operation assuming the gauge system was designed for a nominal 12-volt system and that the regulator in FIG. 1 was a nominal 12-volt RMS regulator. This connection however could be extremely dangerous as has already been discussed because various modifications or failures in the electrical system as shown in FIG. 1 can produce high voltages at point A. If this voltage is connected through a diode to point D, the resistor R1 in the fuel tank could easily become incandescent, igniting the fuel in the tank with disastrous results.

It is an object of this invention to produce an electrical system which may be safely connected from point A of FIG. 1 to point D of FIG. 2. This connection between two known circuits must supply the required power for the gauge of FIG. 2 while protecting the gauge of FIG. 2 from destructive voltages even if the circuit of FIG. 1 is open at point B.

It is a further object to the present invention to do this without the use of components such as fuses which would be blown by a failure such as the inclusion of a switch at point B.

It is a further object of this invention to use components in this invention in such a way that failures of those components, in a method that is reasonable to expect, will not result in excessive or dangerous voltage being applied to the gauge system of FIG. 2.

It is a further object to this invention to accomplish the forgoing in the smallest package possible with a minimum number leads thus reducing the likelihood of incorrect connection of those leads.

It is a further object of this invention to produce an assembly that even if the leads are reversed or otherwise missconnected, dangerous voltages will not be produced across resistor R1.

It is a further object of this invention to minimize the power dissipation of this assembly even under fault conditions such as when a switch is open at location B.

The above and other objects of this invention are achieved in the rectification and regulation system as shown in FIG. 3. The components of this system allow for the rectification of power from point A primarily by diode D1, and the flow of that power to point D through resistor R2 under normal operating conditions. Under these conditions as will later be described, the transistor Q1 is turned on whenever point A is positive with respect to point D. When turned on, the resistance of Q1, shown as a N channel mosfet, is low in comparison to R1, R2, and the resistance of L1 and L2. Transistor Q1 and the other electrical components are however arranged so that if excessive voltage is present at point A, the current through this circuit to point D is limited to a predetermined maximum value during one quarter of the electrical cycle, and to zero during the remaining three quarters of the electrical cycle. Under these conditions resistor R2 serves as a current shunt to control transistor Q1. Thus the circuit prevents excessive or dangerous power from being applied to the gauge system of FIG. 2 and also protects it's own internal components.

PREFERRED EMBODIMENT OF THE INVENTION

Within the teaching of the invention, one skilled in the art could use this invention to supply power to and protect systems other than fuel gauges. Resistor Rm can in general be representative or the load of all such systems.

Figure 1:
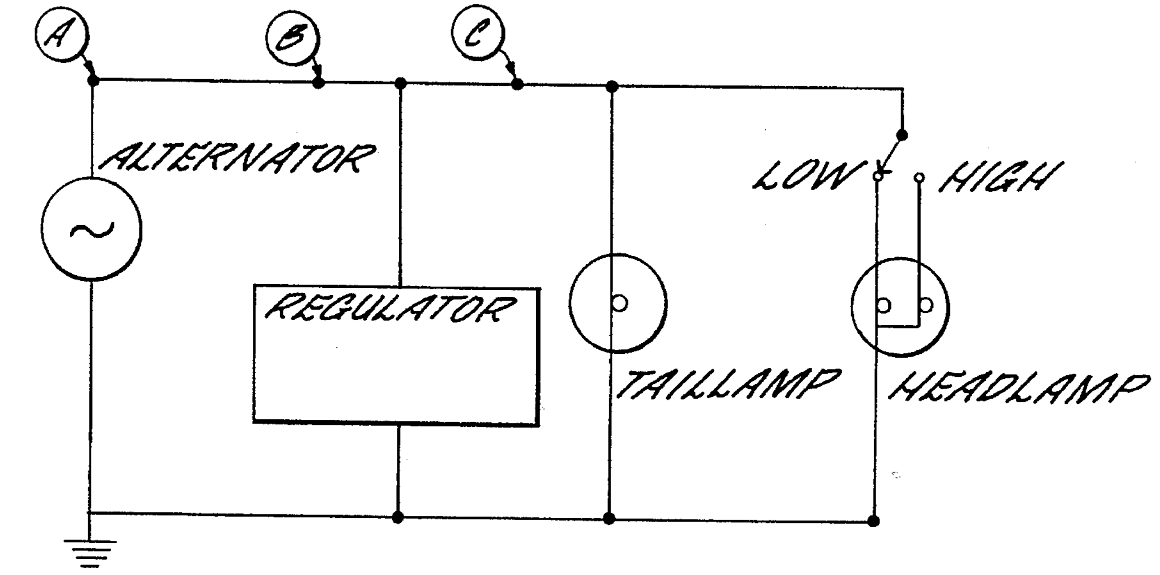
Fig. 1. PRIOR ART
FIG. 1 is a simplified electrical circuit diagram typical of small recreational vehicles such as snowmobiles.
Figure 2:
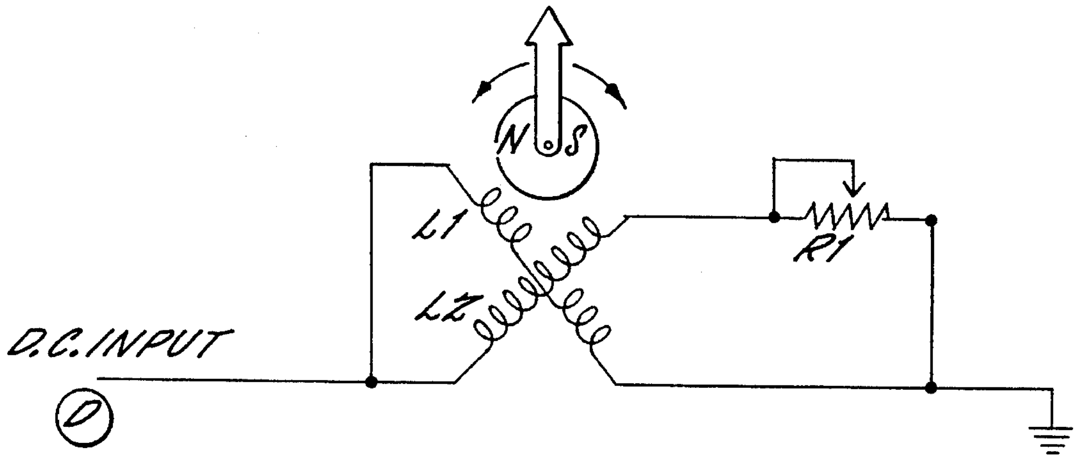
Fig. 2. PRIOR ART
FIG. 2 is an electrical and partial mechanical diagram of a known fuel gauge system that is normally used in automotive applications.

FIG. 1 and FIG. 2 represent known portions of commercial vehicles that have been briefly described in the preceding sections and will not be described again in this section.

Figure 4:
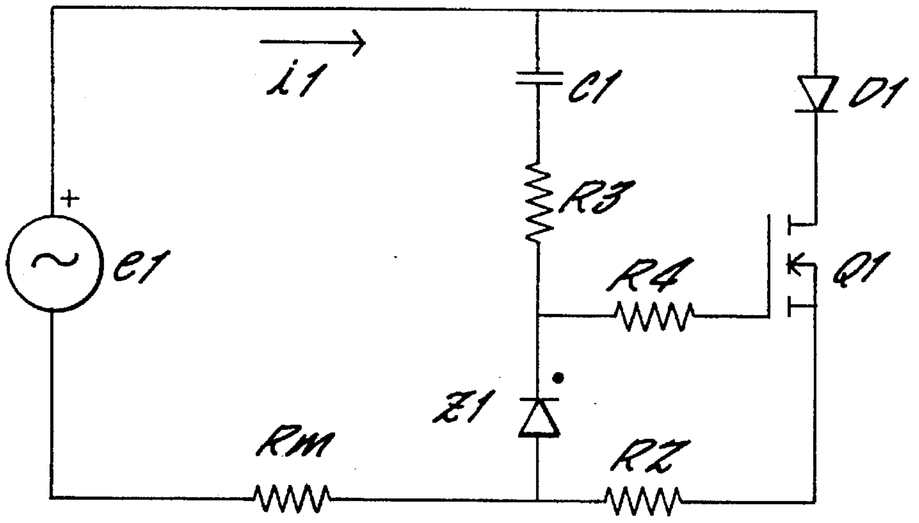
FIG. 4 is a combination of the circuit of FIG. 3 with the alternator from FIG. 1 and a resistor Rm which represents the equivalent resistance of the components of FIG. 2.
Figure 5:
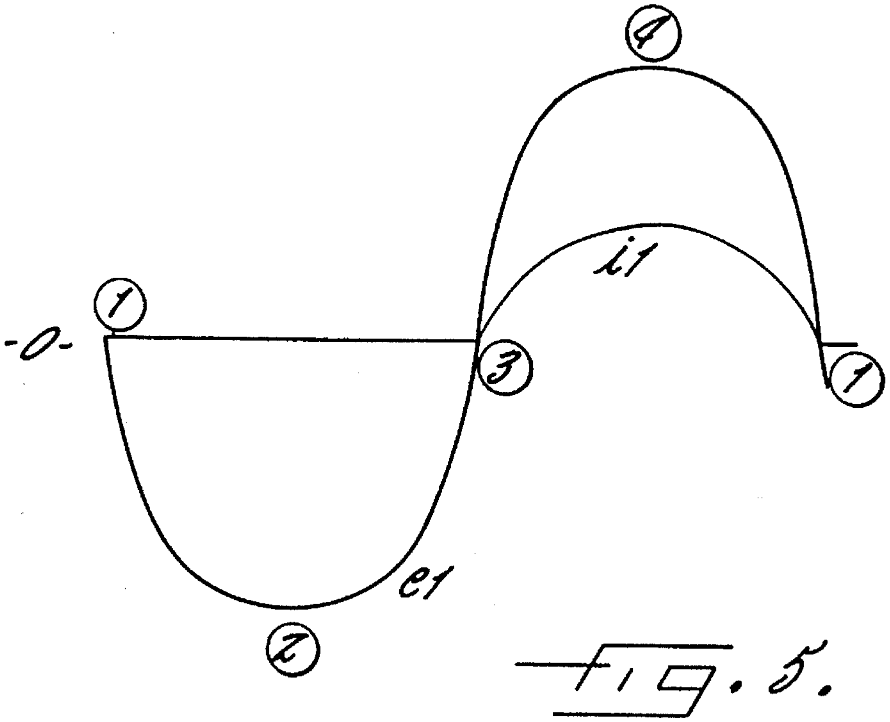
FIGS. 5, 6, 7, and 8 show current and voltage waveforms for the circuit of FIG. 4 under two different operating conditions.
Figure 6:
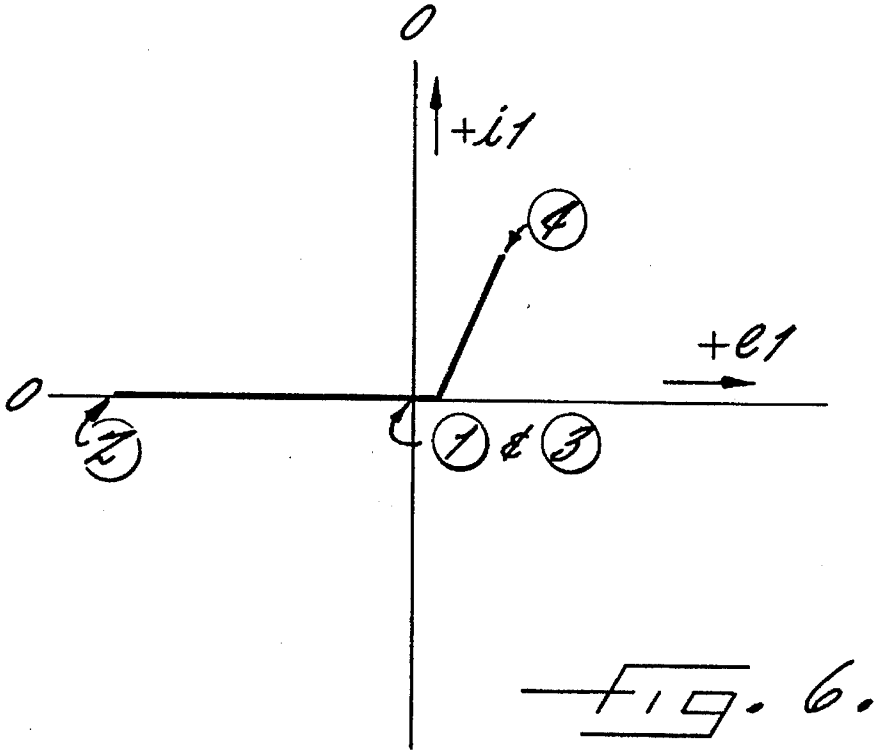
Figure 7:
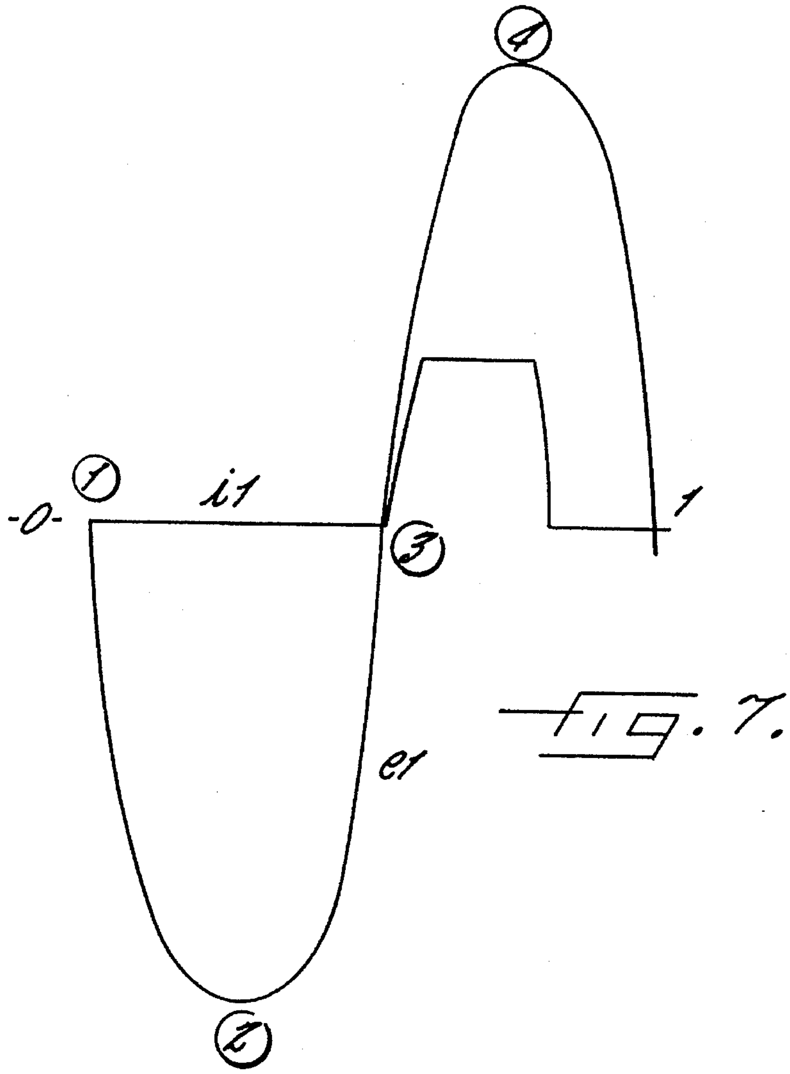
Figure 8:
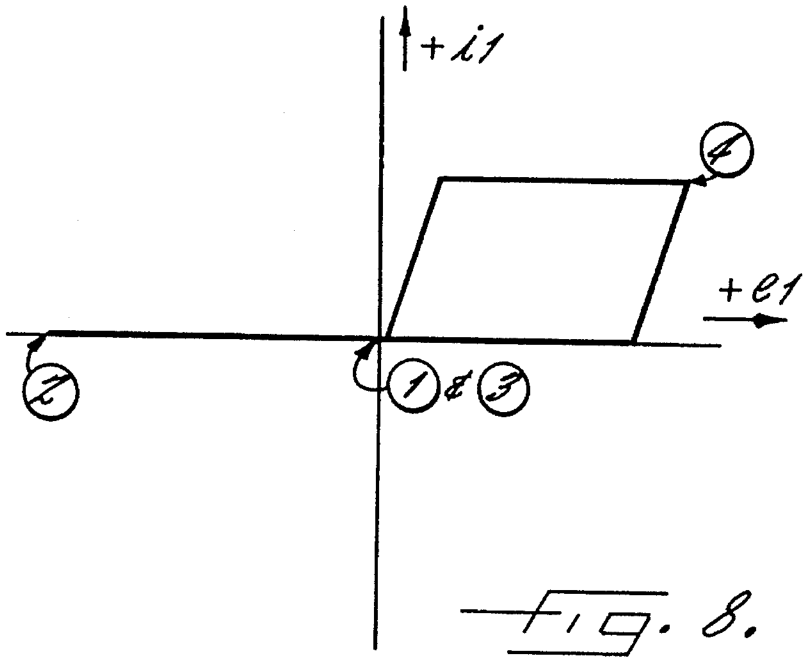

The operation of the circuit will now be described in reference to FIGS. 4–8. FIG. 4 is the circuit diagram of this invention shown connected to a load Rm representing a metering system, and a source of alternating power E1 representing a alternator. FIG. 5, shows the voltage and current waveforms at selected points of the system of FIG. 4 representative of a voltage level below the level at which current limiting is desired. FIG. 5 is a representation of the variation of this voltage and current with time. FIG. 6, under the same conditions as FIG. 5, is a plot or representation, of voltage vs current. FIG. 7 and FIG. 8 are similar representations but with the voltage E1 increased to a level that the circuit of this invention limits the current to a desired level. The following values for circuit components are given as an aid to understanding the following description and are in no way to be considered limiting since other values may be adapted to the teaching of this invention by one skilled in the art.

The values are given in some case in numerical values such as ohms for a resistor and in others with commercially published component type numbers available from numerous manufacturers C1, 0.01 MF; D1, IN4004; R2, 70 ohm; R3, 27000 ohm; R4, 27000 ohms; Z1, IN5247; Q1, IRF612. For purposes of this description, assume that the effective resistance of the meter system represented by Rm is 100 ohms. This description is started as the voltage transitions through zero in the negative direction. As the voltage increases from, point 1 to, point 2, diode D1 prevents flow of current except through capacitor C1 resistor R3 and forward biased Zener Z1. At the low frequencies involved, essentially the entire voltage appears across C1 which is thus charged to the E1 negative peak at point 2. As the negative portion of the waveform decreases to zero at point 3, the charge on capacitor C1 will produce a positive voltage on the gate of transistor Q1 essential equal to the magnitude of the negative peak at point 2, provided that peak is lower than the avalanche voltage of Zener diode Z1. If it is higher than the voltages of Z1 the voltage on the gate will be limited by Z1 thus protecting the transistor Q1 from excessive voltage. The above simplified description assumes that the input capacitance of Q1 is much smaller than the value of C1, and that the time constants between R3 and R4 compared to value of C1 are short compared to the period of the voltage El. Methods of computing and understanding these voltages, where the time constants or impedances are not negligible, are readily understood by those skilled in the state of the art and might be used to advantage in some applications of this invention.

Thus as the voltage waveform passes point 3, a gate voltage exists on the gate of transistor Q1 so that transistor Q1 is turned on. Thus the impedance of Q1 is low compared to other impedances in the circuit from the very beginning of the positive half cycle. The current waveform, I1, during the positive half cycle as shown in FIG. 5 and 6, is thus essentially what would be expected from a diode D1 in series with a 170 ohm resistor, that being the sum of the resistance representative of the meter system Rm and R2. FIGS. 7 and 8 represent the operation of this circuit with the level of voltage of E1 increased so that the peak current would exceed a selected or desired level, except for the operation of the limiting features of this invention.

During the negative portion of the cycle from 1 to 3 the operation is as previously described. As the voltage and therefore current is increased from point 3 toward point 4, a voltage drop appears across R2. The voltage from the gate to the source of transistor Q1 cannot exceed the voltage established by Zener diode Z1 minus the instantaneous drop across R2. For example, if the voltage required to turn on Q1 is 3 volts and the voltage of zener diode Z1 is 17 volts, the maximum voltage that can appear across resistor R2 is 14 volts. Any additional increase in voltage E1 above the level which would produce 14 volts across R1 will result not in a further increase of voltage across R2 but in a increase in voltage across the drain to source terminals of Q1. Thus the current will be limited to a desired value.

A particularly desirable feature of this invention is that this limiting to this desired and selected value occurs only until point 4, the peak of the positive waveform is reached.

Figure 3:
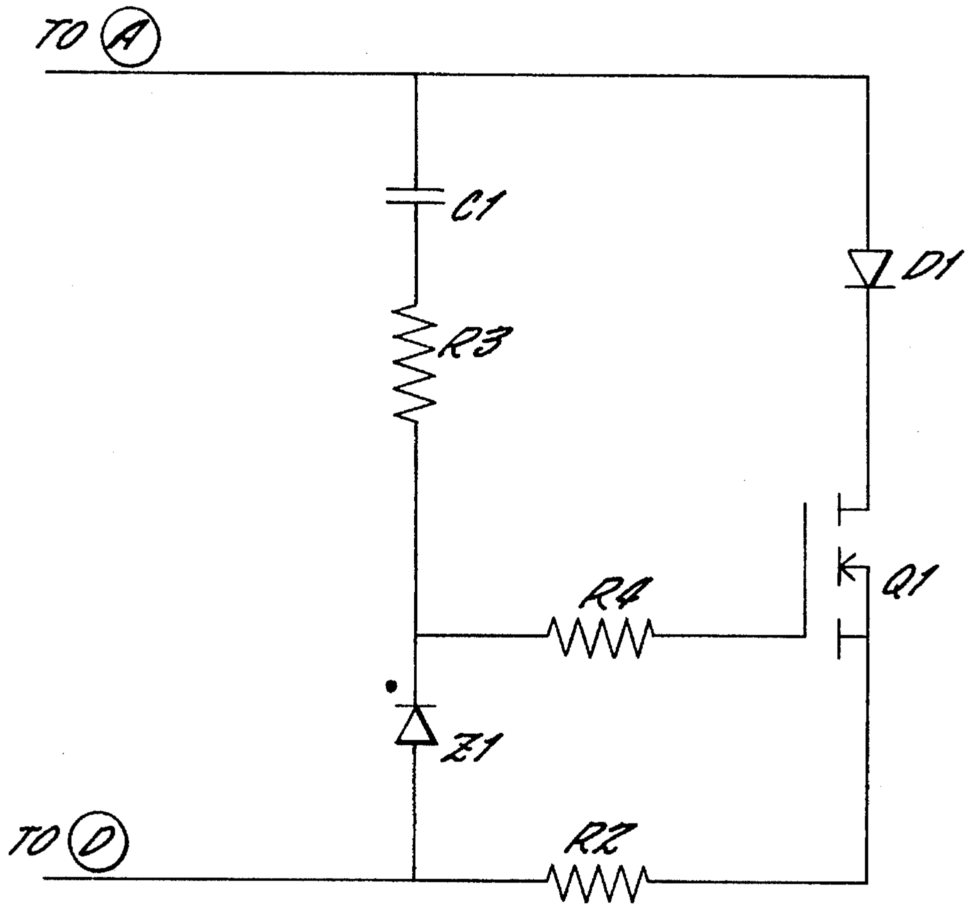
FIG. 3 is an electrical circuit diagram of the present invention used to safely connect the circuit for FIG. 1 to the circuit of FIG. 2.

As soon as the input voltage E1 starts to decrease from point 4 toward point 1, a current flow through capacitor C1 further decreases the available gate voltage of transistor Q1. Thus, at the point where the peak voltage across the components of FIG. 3, has deceased approximately 14 volts, in this example, below the peak voltage at point 4, the current I1 has reduced to zero. The voltage vs current waveform therefore closely approximates a trapezoid.

It will be understood to one skilled in the art that transistor Q1 is then conducting not one-half of the electrical cycle as in FIG. 5, but approximately one-quarter of the electrical cycle. This has the desirable effect of reducing the power dissipation in Q1 to approximately half the value that would occur in a current limit that was not dependant as just described on whether the voltage waveform was increasing or decreasing. The same 2 to 1 reduction of power results in the load Rm. One skilled in the art might substitute many other amplifying devices, generally having an input terminal, an output terminal, and a common input-output terminal for Q1. It should be noted that the circuit of this invention has only 2 connections. Specifically it dose not require a third or ground connection which might come loose, disabling the circuit and creating a safety hazard. If either wire is disconnected from this circuit, no power is available to the meter which is the safe condition. If the circuit is connected backwards, the meter will read wrong but will not overheat. It is known to those that work with components of these types that component such as Q1 or capacitor C1 are occasionally subject to failures where they are effectively short circuited. Resistors however very rarely fail short-circuited.

Consideration will now be given to the safety aspect of this invention in case of component failure. Resistors are available and known that will open circuit if exposed to excessive power. An example would be a Dale CMF55-39. If transistor Q1 fails shorted or diode D1 fails, the increase in power in resistor R2, if of this type, results in an open circuit protecting the meter circuit Rm from excessive power and the resulting explosion hazard. Under these conditions, the high value of resistor R4 would also prevent excessive power from flowing through Z1. Similar protection from a failure of capacitor C1 is provided by the high resistance of resistor R3.

I claim:

1. A system for controlling the flow of electrical current to a fuel gauge assembly from a source of electrical power having a cyclic waveform the amplitude of which varies with time, said system comprising:

an amplifying device with an input terminal, an output terminal, and a common input-output terminal, means for rectifying the waveform, means of supplying a signal to said input terminal to turn on said amplifying device during one portion of the waveform of said source of electrical power, and means of reducing said signal to prevent the current through the system from rising above a selected level, and means for maintaining said current at said selected level until a selected point of said cyclic waveform; and means for conducting current for one-half cycle at low values of said source of electrical power and for one-quarter cycle at high values of said source of electrical power.

2. The system of claim 1 wherein means of supplying a signal contains a capacitor.

3. The system of claim 1 wherein the portion of said waveform when power may flow to said gauge is reduced when the current of the waveform reaches the selected level.

4. A system for controlling the flow of electrical current to a gauge assembly from a source of electrical power having a cyclic waveform the amplitude of which varies with time, said system comprising:

an amplifying device with an input terminal, an output terminal, and a common input-output terminal, means for rectifying the waveform, said input terminal and said common input-output terminal being connected in series with said source of power and said gauge to control the current flow through said gauge, means of supplying a signal to said input terminal to turn on said amplifying device during one portion of the waveform of said source of electrical power, and means of reducing said signal to prevent the current through the system from rising above a selected level while maintaining current flow for a selected period of time; and wherein the current through said gauge assembly has a duration of ½ cycle of said cyclical waveform when the amplitude of the peak voltage of said source of power is insufficient to produce a current of said selected level, and a duration of ¼ cycle where said amplitude is sufficient to produce said selected level.

5. A gauge system consisting of a series connection of a source of AC electrical power, a gauge including a gauge sending unit, and a two-terminal electronic current regulator, said current regulator containing a rectifying means, a current shunt means, and an amplifying means, said amplifying means being responsive to the voltage across said shunt means to control the maximum current through said series connection to a selected level, for a selected finite portion of the AC power waveform; wherein said amplifying means comprises an input terminal, an output terminal and a common input-output terminal, wherein said input terminal is effectively connected through a capacitor to a first terminal of said regulator and through a voltage reference to the second terminal of said regulator; and wherein said regulator allows current to flow for ½ cycle of said AC power where the maximum current through said series connection is below said selected level but for ¼ cycle when said selected level is reached.

6. The system of claim 5 wherein said amplifying device is an enhancement mode field effect transistor.

7. The system of claim 5 wherein said shunt is constructed to open circuit above a selected overload current and all current paths in parallel with said shunt are protected by high impedance passive components.

* * * * *